No. 690,645. Patented Jan. 7, 1902.
L. S. FORD.
TRUNK OR BALE ROPE ATTACHMENT.
(Application filed Apr. 17, 1901.)
(No Model.)
Fig. 1.
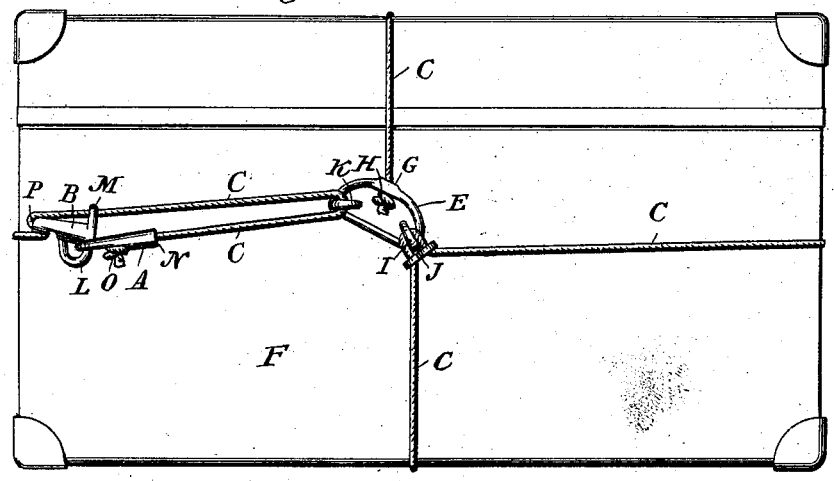
Fig. 2.
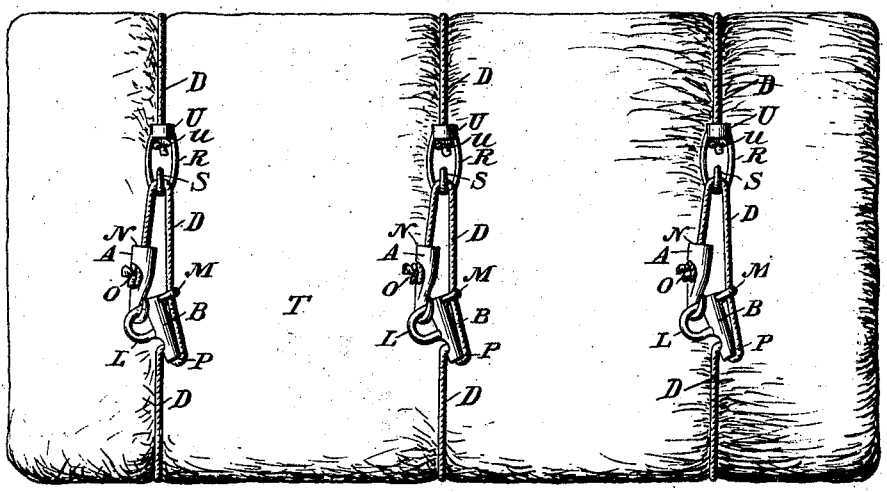
Fig. 3.
Fig. 4.
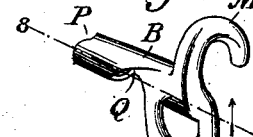
Fig. 5.
Fig. 6.
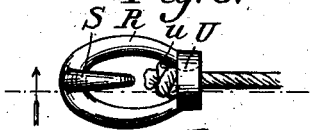
Fig. 7.
Fig. 8.
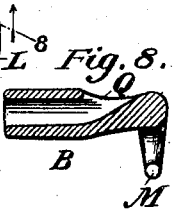
Witnesses:
Jno. Huffman
A. M. B. Ellington
Inventor:
Lester S. Ford
THE NORRIS PETERS CO., PHOTO-LITHO., WASHINGTON, D. C.

UNITED STATES PATENT OFFICE.

LESTER SHIPLEY FORD, OF REIDSVILLE, NORTH CAROLINA.

TRUNK OR BALE ROPE ATTACHMENT.

SPECIFICATION forming part of Letters Patent No. 690,645, dated January 7, 1902.

Application filed April 17, 1901. Serial No. 56,342. (No model.)

*To all whom it may concern:*

Be it known that I, LESTER SHIPLEY FORD, a citizen of the United States, residing at Reidsville, in the county of Rockingham and State of North Carolina, have invented a new, simple, and useful Trunk or Bale Rope Attachment, of which the following is a specification.

This invention relates to trunk and bale rope attachments; and it has for its object to effect certain improvements in trunk and bale rope attachments whereby a trunk or bale or similar package can be easily and securely bound.

To this end the main and primary objects of the present invention are to construct a cheap and simple attachment for trunk and bale ropes, to insure a strong tightening of the same, and to make a safe and secure rope for trunks, bales, and similar packages and doing away with the old laborious method of knotting and tying ropes about trunks, bales, and similar packages.

The present invention therefore contemplates the above-named and other objects, which will suggest themselves to those acquainted with this class of attachment devices. The same primarily consists in the features hereinafter described and claimed.

In the accompanying drawings, Figure 1 is a perspective view of a trunk or similar package roped in accordance with this invention. Fig. 2 is a perspective view of a bale roped in accordance with this invention. Fig. 3 shows the hook that is attached to one end of rope. Fig. 4 is a detailed view of the sliding clamp attachments used in both Figs. 1 and 2, which draws and holds rope tight after being adjusted. Fig. 5 is an S-clamp hereinafter described. Fig. 6 is a plan view of the ring with a hook used in the form of the invention shown in Fig. 2. Fig. 7 is a sectional view of the ring shown in Fig. 6. Fig. 8 is a sectional view of the sliding clamp attachment, taken on line 8 8 of Fig. 4, looking in the direction indicated by arrow.

E in Fig. 1 is a ring attached to one end of rope, through which rope C loops or passes after transversely and longitudinally encircling trunk F.

Referring to the accompanying drawings, F represents a trunk or similar package having been transversely and longitudinally encircled by rope C and fastened or made fast by the respective trunk attachments.

E is the center ring, through which the rope C passes at G, and is knotted at H, the perforation G being so arranged as to prevent the slipping through of knot H. The rope C is drawn transversely around trunk F and is looped into hook I on ring E, and then is caught and clamped by S-clamp J, which holds rope C securely while being drawn longitudinally around trunk F and looped into hook K, composing part of the ring E, and after being drawn tight by the end of rope C the adjustment is perfected by hooking hook A into ring L on attachment B and drawing and reversing attachment B from its loose or sliding position to its stationary position, where it clutches rope C and is held in position by M in Fig. 1 and has similar effect upon rope D in Fig. 2. Hooks I and K on ring E are made similar to Fig. 7, their protruding ends being raised just above the lower side of ring E, which prevents rubbing or scratching top of trunk by hook ends and which also prevents displacement of rope C after adjusting. Hook A, as shown in Fig. 3, is provided with an opening in the end N and the side O, with a connecting-passage for ropes C in Fig. 1 or D in Fig. 2. The opposite end or hook is made and shaped to slip easily into ring L of Fig. 4, the curve or crook being such as to prevent all possibility of displacement after adjusting, as shown in Fig. 3. Attachment B, as shown in Fig. 4, is made to slip on the ropes C and D to any place convenient for hook A by means of an axial bore from the end P to the opening Q, which is located on the side under the ring L. The opening Q curves outwardly from the end of the axial bore through the side of attachment B, as shown in Fig. 8, allowing attachment B to slide easily before adjusting. The bore from end P extends about half-way the length of body of attachment B to opening Q, allowing the remainder of body of B to act as lever in drawing ropes C and D tight. The attachment B lies with the open end toward the ring E, and the ring L and hook M are at the end of the attachment farthest from the ring while the rope is being adjusted to ring and being stretched or drawn tight by pulling end of rope to which is attached hook A. The attachment B is then slipped on rope to a position where hook A can be attached in ring L and reverse the ends of B, which causes B to stretch ropes tighter, also to clutch the rope, which prevents all possible slipping after ropes C and D are caught by hook M on attachment B.

Fig. 6 shows the center hook used, similar to E in Fig. 1, only having one hook and to be used on packages wrapped one way. Rope D is knotted and passed through the perforation in the neck U. It then transversely encircles bale T and loops over or through hook S. It is then drawn tight and made fast by sliding attachment B and hook A, as stated in connection with Fig. 1. In Fig. 5 the S-clamp has one side or end closed, so that it may not be removed from the rope, but be allowed to slip to proper position, the other end being open, so that it may clamp and hold tight rope C after looping over hook I in Fig. 1.

Changes in the form, proportion, and minor details of construction may be resorted to without departing from the principle or sacrificing any of the advantages of this invention.

Having thus described the invention, what is claimed, and desired to be secured by Letters Patent, is—

1. As an article of manufacture, the attachment B having a hook M and a ring L, said hook and ring being at same end of said attachment and on opposite sides thereof and at right angles to each other, said attachment being formed with an axial bore extending partly through the attachment and with opening curving outwardly from the end of said bore through the side of the attachment, substantially as set forth.

2. The combination with the ring E having the perforation G and the hooks I and K, of the rope C having a hook at one end thereof and its other end inserted in said perforation G and knotted, said rope also having loops therein engaging the hooks I and K, the attachment B having a hook M and a ring L, and also having an axial bore extending partly through the attachment with an opening from said bore, through the side of said attachment, the rope passing through said bore and said hook, and said hook at the end rope engaging the ring L on said attachment, substantially as described.

3. The combination with a rope, of a ring connected with one end of the rope, the rope also having a looped engagement with said ring, of an attachment having thereon a ring and a hook and also having an axial bore extending partly through the attachment with an opening from said bore curving outwardly through the side of the attachment, the rope passing through said bore and said hook, and said hook at the end of said rope engaging the ring on said attachment, substantially as described.

In testimony that I claim the foregoing as my own I have hereto affixed my signature in the presence of two witnesses.

LESTER SHIPLEY FORD.

Witnesses:
B. M. HITCHCOCK,
WILL WILLIAMS.